United States Patent
Lo et al.

(10) Patent No.: US 7,132,491 B2
(45) Date of Patent: Nov. 7, 2006

(54) CHAIN TRANSFER REAGENT, FREE RADICAL POLYMERIZATION EMPLOYING THE SAME AND RESULTING POLYMERS

(75) Inventors: Yih-Hsing Lo, Ilan (TW); Kuo-Chen Shih, Kaohsiung (TW); Yi-Chun Chen, Hsinchu (TW); Mei-Hua Wang, Jhunan Township, Miaoli County (TW); Fong Yee Hsu, Sinwu Township, Taoyuan County (TW); Ming-Siao Hsiao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 197 days.

(21) Appl. No.: 10/842,141

(22) Filed: May 10, 2004

(65) Prior Publication Data

US 2005/0096440 A1 May 5, 2005

(30) Foreign Application Priority Data

Oct. 31, 2003 (TW) .............................. 92130435 A

(51) Int. Cl.
*C08F 20/54* (2006.01)
*C08F 2/38* (2006.01)

(52) U.S. Cl. ...................... 526/319; 526/117; 526/170; 526/171; 526/172; 526/303.1; 526/305; 526/307.1; 526/307.8; 526/317.1; 526/346; 525/384; 556/15; 556/16

(58) Field of Classification Search .................. 556/15, 556/16, 33, 32, 31, 42, 43, 45, 46, 51, 52, 556/57, 58, 136, 137, 138, 140, 146; 526/117, 526/170, 172, 303.1, 317.1, 319, 346, 171, 526/192, 305, 307.1, 307.8; 525/384
See application file for complete search history.

(56) References Cited

U.S. PATENT DOCUMENTS 6,667,376 B1 * 12/2003 Charmot et al. ............ 526/220

OTHER PUBLICATIONS

Mayadunne et al, Living Radical Polymerization with Reversible Addition-Fragmentation Chain Transfer . . . Using Dithiocarbamates as Chain Transfer Agents, Macromolecules, 1999, 32, 6977-6980.*
Yih et al, Syntheses, Reactivities and Molecular Structures of Tungsten Complexes containing the Diphenylphosphinodithioformato Ligand, J. Chem. Soc. Dalton Trans. 1995, 1305-1313.*
Yih and Lin, Syntheses and reactivity of molybdenum complexes containing the diphenylphosphinodithioformato ligand, Journal of Organometallic Chemistry 577 (1999) 134-139.*

* cited by examiner

*Primary Examiner*—Fred Teskin
(74) *Attorney, Agent, or Firm*—Thomas, Kayden, Horstemeyer & Risley

(57) ABSTRACT

Organometallic reversible addition-fragmentation chain transfer reagents (RAFT reagents), processes of free radical polymerization employing the same and polymers with low polydispersity index obtained thereby. The process includes polymerizing at least one monomer with at least one initiator and at least one organometallic RAFT reagent to obtain polymers having terminal organometallic functional groups with low polydispersity index. In addition, the terminal organometallic functional group may be removed by subjecting the obtained polymer to elimination to provide the corresponding organic polymers.

28 Claims, 1 Drawing Sheet

CHAIN TRANSFER REAGENT, FREE RADICAL POLYMERIZATION EMPLOYING THE SAME AND RESULTING POLYMERS

BACKGROUND OF THE INVENTION

1. Field of the Invention

The invention relates to reversible addition-fragmentation chain transfer reagents (RAFT reagents). More particularly, the present invention relates to organometallic RAFT reagents.

2. Description of the Related Art

Recently, with increased maturity of polymer technologies, polymer applications are involved in not only traditional plastics and synthetic resins industries but also high technology industries such as electronics, optoelectronics, communications and biotechnologies. Some relative polymer materials with specific properties are critical for the related industries. For example, photo resistant reagents for preparation of nano-type devices and nano-polymer hybrid materials for dramatically enhancing mechanical properties are all much sought after.

The properties of polymer materials are dependent on configuration. For example, polymerization degrees, molecular weight distribution and components thereof behave in relation to the performance of the polymer materials. The traditional active cation and anion polymerization methods can be used to control the polymerization degree of some monomers and narrow distribution of molecular weight, however, they are limited in their ability to precisely modify the configuration of polymer products. As well, the variety of monomers applied to the above polymerization methods is limited, and strict reaction conditions thereof also restrict use in related industries.

Free radical polymerization is a recently developed technique for controlled polymerization and is widely used in present industry. Nearly 50% of polymer materials such as styrenes, acrylates, methyl methacrylates (MMA) or acrylonitrile (AN) are polymerized in such way. In addition, reaction conditions of free radical polymerization are also milder compared to those of active cation and anion polymerization due to processing under organic solvents. After removal of oxygen gas and other stabilizers, the free radical polymerization can proceed in water.

Since traditional free radical polymerization methods are unable to control polymerization degrees of polymer products, wider molecular weight distribution of the polymer products is observed and the polydispersity index (defined as the ratio of the weight average molecular weight to number average molecular weight, Mw/Mn) is generally more than 2.

Accordingly, it is necessary to develop a novel polymerization method, in which polymerization degree of polymer products is controllable, in order to provide polymer materials with desired configuration and narrow molecular weight distributions and further explore application of polymer materials.

In 1998, CSIRO disclosed an active free radical polymerization method called reversible addition-fragmentation chain transfer process (RAFT process) to prepare polymer products with narrow molecular weight distribution and further control the polymer chain length. The so-called RAFT process is a combination of general procedures for traditional free radical polymerizations with the addition of a fixed amount of reversible addition-fragmentation chain transfer reagent (RAFT reagent). In general, RAFT process controls most free radical polymerizations for alkene monomers.

However, it is very inefficient to polymerize some monomers, such as acrylate, through RAFT process, since such monomers produce polymerization only under very dilute solution conditions to provide polymer products with narrow molecular weight distribution. Since the above problem causes longer reaction time and incomplete reaction of polymerization, it is neither economical nor convenient.

Furthermore, demands and significance of polymer materials having terminal organometallic functional groups are steadily on the increase due to application thereof to dispersants, hybrid materials, optoelectrical materials and nanotechnologies. However, polymer materials having terminal organometallic functional groups are unable to be prepared through conventional RAFT reagents. Therefore, it is necessary to develop a novel RAFT reagent for preparing polymer materials having terminal organometallic functional groups with controllable polymerization degree.

SUMMARY OF THE INVENTION

Accordingly, an object of the present invention is to provide organometallic RAFT reagents used in free radical polymerization providing precisely modification of the molecular weight of polymer products and narrowing of the distribution of molecular weight. Compared with conventional polymerizations, processes of free radical polymerization employing the organometallic RAFT reagents according to the present invention do not require processing in highly dilute solution, making them suitable for use with any kind of monomer. In addition, the RAFT reagents can be used not only in the preparation of organic polymer materials but also of polymer materials having terminal organometallic functional groups.

Another object of the present invention is to provide free radical polymerization processes employing organometallic RAFT reagents in order to efficiently polymerize free radical polymerizable monomers to produce polymer materials with low polydispersity index.

Still another object of the present invention is to provide polymer materials with low polydispersity index. Due to the specific properties, such as low polydispersity index, controllable molecular weight, and terminal organometallic functional groups, of the polymer materials, the application fields of the polymer materials in the present invention are vast.

To achieve these objects, the organometallic RAFT reagent according to the present invention comprises thiocarbonylthio metallic complexes with the structures represented by formula (I):

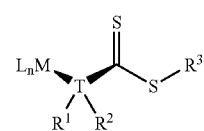

or Formula (II):

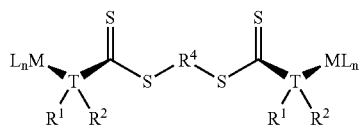

Accordingly, n is 2~5, and L can be the same or different ligand which remains bound to M under polymerization conditions and is monodentate ligand, bidentate ligands, or multi-dentate ligands, such as carbon monoxide, cyanides, halide, phosphorus-containing ligands, nitrogen-containing ligands, sulfur-containing ligands, or oxygen-containing ligands.

T can be the same or different and is P, C, O N or C.

M can be the same or different and is Ti, Zr, Hf, V, Nb, Ta, Cr, Mo, W, Mn, Tc, Re, Fe, Ru, Os, Co, Rh, Ir, N, Pd, Pt or Sc, preferably Ti, Zr, Cr, Mo, W, Fe, Ru, Os, Ni, Pd, Pt, Rh, or Ir, most preferably Cr, Mo, or W.

$R^1$ and $R^2$ can be the same or different and is H, saturated or unsaturated alkyl group, cycloalkyl group, heterocycloalkyl group, polycyclic alkyl group, aryl group, heteroaryl group, or alkylaryl group, with the saturated or unsaturated alkyl group straight or branched and having 1 to 20 carbon atoms.

$R^3$ can be alkyl group, aryl group, alkylaryl group, aminoalkyl group, alkylamino group, alkyloxy group, cycloalkyl group, heterocycloalkyl group, polycyclic alkyl group, —R"CN or —R"COOH, with R" a saturated or unsaturated alkyl group having 1 to 20 carbon atoms, and, preferably, $R^3$ —$CH_2$Ph or —$CH_2$CN.

$R^4$ can be alkylene group, arylene group or alkylarylene group, such as methylene group, ethylene group, or propylene group.

To achieve another object of the present invention, the present invention also provides a free radical polymerization process employing organometallic RAFT reagents. The process provides at least one free radically polymerizable monomer to react with at least one initiator and at least one organometallic RAFT reagent to undergo polymerization to produce polymers having terminal organometallic functional groups with low polydispersity index, with the at least one organometallic RAFT reagent comprising thiocarbonylthio metallic complexes with structures shown by formula (I) or formula (II).

Moreover, the free radical polymerization process employing organometallic RAFT reagents further comprise, after completing the preparation of polymers having terminal organometallic functional groups, subjecting the obtained polymers to elimination to remove the terminal organometallic functional group thereof, providing the corresponding organic polymers.

The present invention additionally provides polymers with low polydispersity index processed with at least one free radically polymerizable monomer, at least one initiator and at least one organometallic RAFT reagent via polymerization, wherein the at least one RAFT reagent comprises the thiocarbonylthio metallic complexes with the structures represented by formula (I) or formula (II).

According to the polymers of the present invention, the polydispersity index thereof is 1.4 or less. Preferably, the polydispersity index thereof is 1.3 or less in some preferred embodiments.

The present invention also provides another polymer with low polydispersity index, the reaction product of the following steps.

First, at least one free radically polymerizable monomer is reacted with at least one initiator and at least one organometallic RAFT reagent via polymerization to prepare polymers having terminal organometallic functional groups, wherein the at least one organometallic RAFT reagent comprises the thiocarbonylthio metallic complexes with the structures represented by formula (I) or formula (II).

Next, the obtained polymers are subjected to elimination to provide the corresponding organic polymers with polydispersity index of 1.4 or less through the removal of the terminal organometallic functional group thereof.

In order to understand the above and other objects, characteristics and advantages, the preferred embodiments and comparative embodiments of the present invention are now detailed described with reference to the accompanying drawings.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
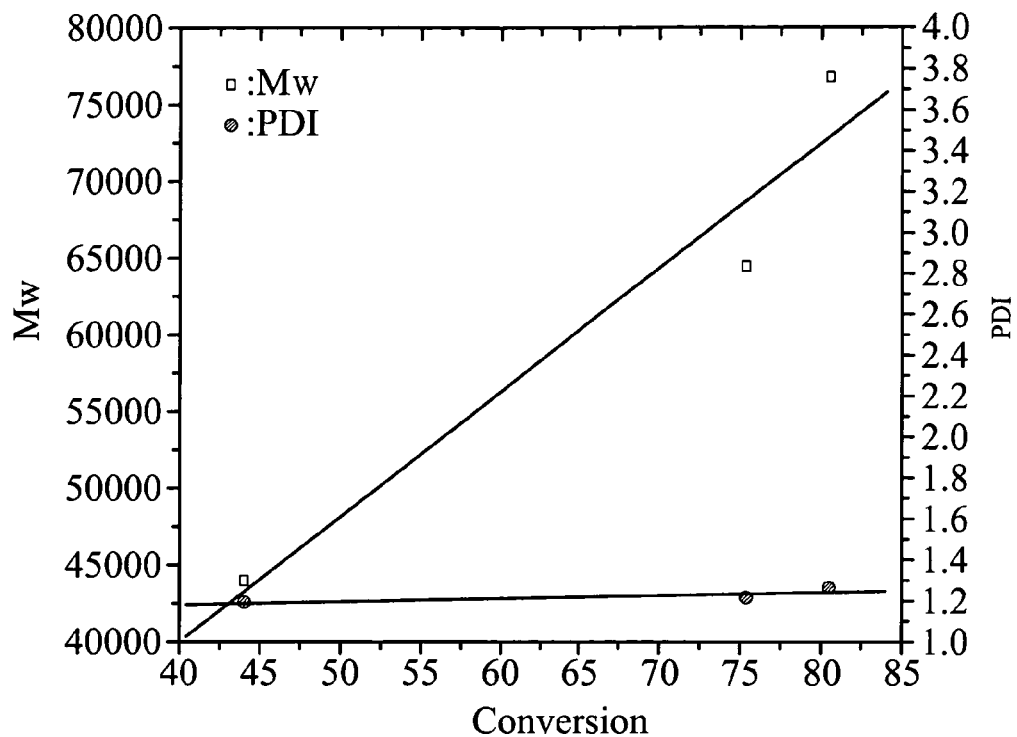
FIG. 1 is a graph plotting molecular weight and polydispersity index against conversion of polymers as disclosed in Example 6~8.

In order to further understand the present invention, the suitable reactants for the polymerizations according to the present invention are described in the following.

According to the present invention, the at least one initiator employed is an agent, such as peroxide or azo initiator, which generates, upon activation, free radical species through decomposition, and can be 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-(N)-(1,1)-bis(hydroxymethyl)-2-hydroxyethyl]propionamide, 2,2'-azobis [2-methyl-N-hydroxyethyl)]propionamide, 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl]propionamide, 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide)dihydrate, 2,2'-azobis(2,2,4-trimethylpentane), 2,2'-azobis(2-methylpropane), dilauroyl peroxide, tertiary amyl peroxides, tertiary amyl peroxydicarbonates, t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, potassium peroxydisulfate, ammonium peroxydisulfate, di-tert butyl peroxide, di-t-butyl hyponitrite, dicumyl hyponitrite or combinations thereof.

According to the present invention, the at least one free radically polymerizable monomer can be acrylate, styrene or derivatives thereof. "Derivative" herein means a monomer having substituent functional groups, such as, but not limited to, fluorine atom, halogen atom, alkyl group, alkoxy group, phenyl group, phenoxy group, heterocyclic group, cyano group, halogen atom, trifluoromethyl group, silyl group, and the like.

In the present invention, the acrylate and derivatives thereof serving as reactive monomers can be acrylic acid, methyl acrylate, dimethylamino ethyl acrylate, diethylamino ethyl acrylate, ethyl acrylate, n-propyl acrylate, isopropyl acrylate, n-butyl acrylate, isobutyl acrylate, sec-butyl acrylate, t-butyl acrylate, hexyl acrylate, methacrylic acid alkyl ester, (1,6-hexanediol di(meth)acrylate, neopentylglycol di(meth)acrylate, neopentylglycol adipate di(meth)acrylate), neopentylglycol di(meth)acrylate hydroxypivalate, dicyclopentadienyl di(meth)acrylate, allylated cyclohexyl di(meth)acrylate, isocyanurate di(meth)acrylate, trimethylol propane tri(meth)acrylate, dipentaerythritol tri(meth)acrylate, propionic acid dipentaerythritol tri(meth)acrylate, pentaerythritol tri(meth)acrylate, tri(acryloxyethyl) isocyanurate, dipentaerythritol penta(meth)acrylate, dipentaerythritol hex(meth)acrylate or derivatives substituted optionally by at least one fluorine atom, alkyl, or alkyloxy group of the above.

According to another aspect of the present invention, the acrylate and derivatives thereof can be acrylate is monomers according to formula (III) or formula (IV).

Formula (III) is

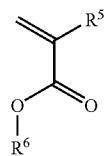

and Formula (IV) is

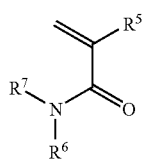

Accordingly, $R^5$ can be hydrogen atom, fluorine atom, halogen atom, cyano group, saturated or unsaturated alkyl group, amino group, cycloalkyl group, heterocycloalkyl group, polycyclic alkyl group, aryl group, heteroaryl group, alkylaryl group, or arylalkyl group, wherein the saturated or unsaturated alkyl group can be straight or branched and has 1 to 20 carbon atoms.

$R^6$ and $R^7$ can be the same or different and is hydrogen atom, saturated or unsaturated alkyl group, cycloalkyl group, heterocycloalkyl group, polycyclic alkyl group, adamantyl group, aryl group, heteroaryl group, or alkylaryl group, wherein the saturated or unsaturated alkyl group can be straight or branched and has 1 to 20 carbon atoms.

In addition, at least one hydrogen atom bonded to the carbon atom of the acrylate monomers according to formula (III) or formula (IV) can be substituted optionally by fluorine atom, halogen atom, cyano group, alkyl group, alkoxy group, heterocycloalkyl group, aryl group, alkylaryl group, or heteroaryl group.

In the present invention, the styrene and derivatives thereof serving as reactive monomers can be styrene monomers according to formula (V).

Formula (V) is

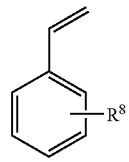

Accordingly, $R^8$ can be hydrogen atom, fluorine atom, halogen atom, cyano group, saturated or unsaturated alkyl group, amino group, cycloalkyl group, heterocycloalkyl group, polycyclic alkyl group, aryl group, heteroaryl group, alkylaryl group, or arylalkyl group, wherein the saturated or unsaturated alkyl group can be straight or branched and has 1 to 20 carbon atoms.

In addition, at least one hydrogen atom bonded to the carbon atom of the styrene monomers according to formula (V) can be substituted optionally by fluorine atom, halogen atom, cyano group, alkyl group, alkoxy group, heterocycloalkyl group, aryl group, alkylaryl group, or heteroaryl group.

The following embodiments are intended to clarify the invention more fully without limiting the scope of the claims, since numerous modifications and variations will be apparent to those skilled in this art.

Preparation of Organometallic Raft Reagents

EXAMPLE 1

Organometallic RAFT reagents (1):

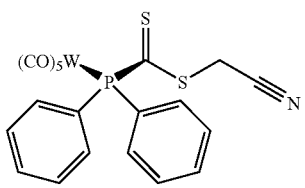

In a nitrogen atmosphere, 0.65 g (1 mmol) of $[W(CO)_5P(C_6H_5)_2C(=S)S]K$, and 30 ml of dichloromethane were added to a round-bottom flask at room temperature to provide a maroon solution. Next, 2 ml of iodomethyl cyanide was added to the round-bottom flask, providing a red solution. After mixing completely for 60 minutes, the solvent was removed by vacuum evaporation, and the resulting mixture subjected to extraction with toluene, filtered, and condensed, providing $W(CO)_5P(C_6H_5)_2C(=S)SCH_2CN$, a thiocarbonylthio metallic complex according to the present invention. The reaction according to Example 1 is shown below.

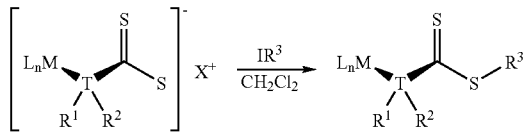

L=CO, M=W, T=P, R¹=R²=phenyl, R³=CH₂CN, X=K, n=5.

The analysis data:

¹H NMR (CDCl₃, ppm): δ 4.09 (s, 2H, CH2), 7.13 (m, 6H, Ph), 7.81 (m, 4H, Ph).

³¹P NMR (CDCl₃, ppm): δ 63.4 (Jw–p=251.99 Hz).

EXAMPLE 2

Organometallic RAFT reagents (2):

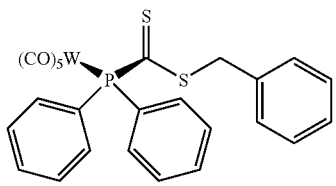

In a nitrogen atmosphere, 0.74 g (1 mmol) of [W(CO)₅P(C₆H₅)₂C(=S)S]Et₄N, and 30 ml of dichloromethane were added to a round-bottom flask at room temperature to provide a maroon solution. Next, 2 ml (2 mmol) of α-benzyl bromide was added to the round-bottom flask. After mixing completely for 60 minutes, the solvent was removed by vacuum evaporation, and the resulting mixture subjected to extraction with toluene 20 ml, filtered, and condensed, providing W(CO)₅P(C₆H₅)₂C(=S)SCH₂C₆H₅, a thiocarbonylthio metallic complex according to the present invention. The reaction according to Example 2 is shown below.

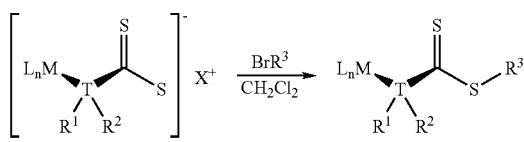

L=CO, M=W, T=P, R¹=R²=phenyl, R³=benzyl, X=Et₄N, n=5.

The analysis data:

1H NMR (CDCl3, ppm): δ 4.51 s (s, 2H, CH2), 7.28 m (m, 5H, Be), 7.47 m (m, 6H, Ph), 7.64 m (m, 4H, Ph).

31P NMR (CDCl3, ppm): δ 59.8 (Jw–p=251.99 Hz).

EXAMPLE 3

Organometallic RAFT reagents (3):

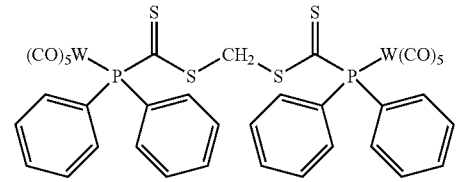

In a nitrogen atmosphere, 0.74 g (1 mmol) of [W(CO)₅P(C₆H₅)₂C(=S)S]K, and 30 ml of dichloromethane were added to a round-bottom flask at room temperature to provide a maroon solution. Next, 0.03 ml (1 mmol) of methylene iodide was added to the round-bottom flask. After mixing completely for 80 minutes, the solvent removed by vacuum evaporation, and the resulting mixture was subjected to extraction with toluene 20 ml, filtered, and condensed, providing [W(CO)₅P(C₆H₅)₂C(=S)SCH₂S(=S)C(C₆H₅)₂PW(CO)₅], a thiocarbonylthio metallic complex according to the present invention. The reaction according to Example 3 is shown below.

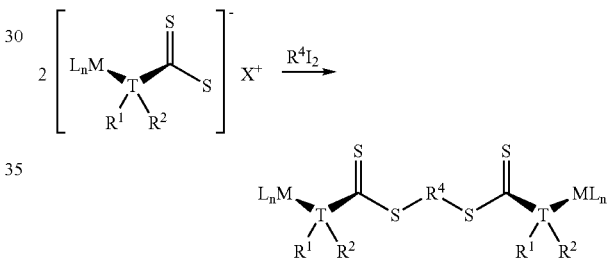

L=CO, M=W, T=P, R¹=R²=phenyl, R⁴=—CH—, X=K, n=5.

The analysis data:

¹H NMR (CDCl₃, ppm): δ 5.01 (s, 2H, CH2), 7.40–7.66 (m, 10H, Ph).

³¹P NMR (CDCl₃, ppm): δ 59.55 (Jw–p=250.96 Hz).

EXAMPLE 4

Organometallic RAFT reagents (4):

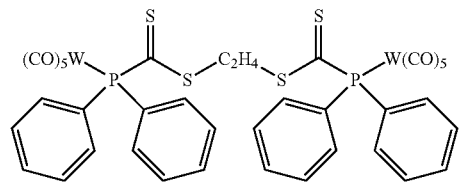

Example 4 was performed as Example 3 except for substitution of 0.032 ml of ethylene iodide for 0.03 ml of methylene iodide. After filtering and condensing, the residue was subjected to purification, providing [W(CO)₅P(C₆H₅)₂C(=S)SC₂H₄S(=S)C(C₆H₅)₂PW(CO)₅]. The analysis data:

$^1$H NMR (CDCl$_3$, ppm): δ 4.08 (s, 4H, CH2), 7.45–7.78 (m, 10H, Ph).
$^{31}$P NMR (CDCl$_3$, ppm): δ 61.27 (Jw–p=254.05 Hz).

EXAMPLE 5

Organometallic RAFT reagents (5):

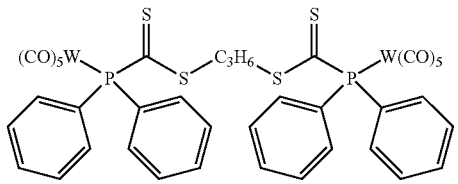

Example 5 was performed as Example 3 except for substitution of 0.033 ml of propylene iodide for 0.03 ml of methylene iodide. After filtering and condensing, the residue was subjected to purification, providing [W(CO)$_5$P(C$_6$H$_5$)$_2$C(=S)SC$_2$H$_4$S(=S)C(C$_6$H$_5$)$_2$PW(CO)$_5$]. The analysis data:
$^1$H NMR (CDCl$_3$, ppm): δ 1.97 (m, 2H, SCH$_2$CH2), 3.34 (s, 4H, SCH2), 7.50–7.66 (m, 10H, Ph).
$^{31}$P NMR (CDCl$_3$, ppm): δ 59.64 (Jw–p=250.13 Hz).

Free Radical Polymerization Employing Organometallic Raft Reagents

EXAMPLE 6

Polymer (1)

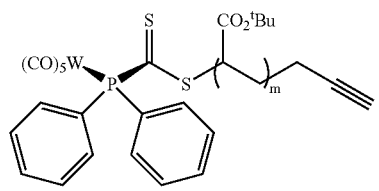

m≧2

5.4 mg (0.027 mmol) AIBN, as an initiator, and Organometallic RAFT reagents (1) (0.0649 mmol) were put into a polymerization bottle, bottle gas was displaced with nitrogen and 1.25 ml dehydrated toluene and isobutyl acrylate (25.6 mmol), as monomers were added. The above mixture was degassed with four freeze-pump-thaw cycles in the closed system to remove oxygen, the system was heated to 60° C. and reacted 6 hours. After reaction and cooling, the solvent was removed by vacuum evaporation and dimethylformamide was added. By precipitation with water, a polymer product in a 80% yield was obtained, with average molecular weight of 76705 by gel permeation chromatography (GPC) analysis, with polydispersity index (PDI) of 1.26.

The reaction according to Example 3 is shown below.

L=CO, M=W, n=5, T=P, R$^1$=R$^2$=phenyl, R$^3$=CH$_2$CN, R$^5$=H, R$^6$=—C(CH3)3, m≧2.

EXAMPLES 7~8

Examples 7 and 8 were performed as Example 6 except that reaction times were reduced to 3 hours and 1 hour, respectively. The properties of polymer products thereof are shown in Table 1.

The exact relationship between molecular weight, polydispersity index, and conversion of polymers as disclosed in Example 6~8 is shown in FIG. 1.

COMPARATIVE EXAMPLE 1

Comparative Example 1 was performed as Example 6 except with an absence of organometallic RAFT reagent and the reduced reaction time of 3 hours. The properties of polymer product thereof are shown in Table 1.

TABLE 1

|  | Molar rate of monomers to organometallic RAFT reagent (1) | Reaction time | conversion (%) | weight average molecular weight (Mw) | PDI (Mw/Mn) |
| --- | --- | --- | --- | --- | --- |
| Example 6 | 600 | 6 | 80.5 | 76705 | 1.26 |
| Example 7 | 600 | 3 | 75.4 | 64416 | 1.21 |
| Example 8 | 600 | 1 | 44.1 | 43894 | 1.19 |
| Comparative example 1 |  | 3 | 96.2 | 185859 | 1.42 |

EXAMPLE 9

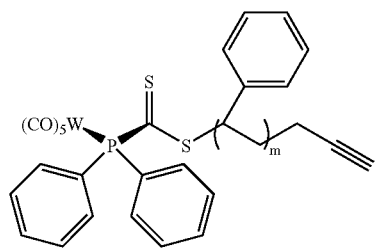

Polymer (2)

$m \geqq 2$ 5.5 mg (0.028 mmol) AIBN, as an initiator, and Organometallic RAFT reagents (1) (0.048 mmol) were put into a polymerization bottle, the bottle gas was displaced with nitrogen and 1.25 ml dehydrated toluene and styrene (28.0 mmol), as monomers were added. The above mixture was degassed with five freeze-pump-thaw cycles in the closed system to remove oxygen, the system was heated to 60° C. and reacted for 25 hours. After reaction and cooling, the solvent was removed by vacuum evaporation and dimethylformamide was added. By precipitation with water, a polymer product, as a pink solid in a 32% yield, was obtained with average molecular weight of 35391 by gel permeation chromatography (GPC) analysis, with PDI of 1.33.

The reaction according to Example 9 is shown below.

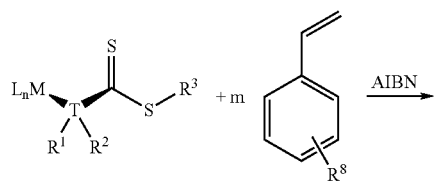

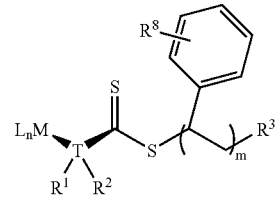

L=CO, M=W, n=5, T=P, $R^1$=$R^2$=phenyl, $R^3$=$CH_2CN$, , $m \geqq 2$.

EXAMPLES 10~11

Examples 10 and 11 were performed as Example 9 except that reaction times were reduced to 20 hours and 15 hour respectively. The properties of polymer products thereof are shown in Table 2.

Figure 2:
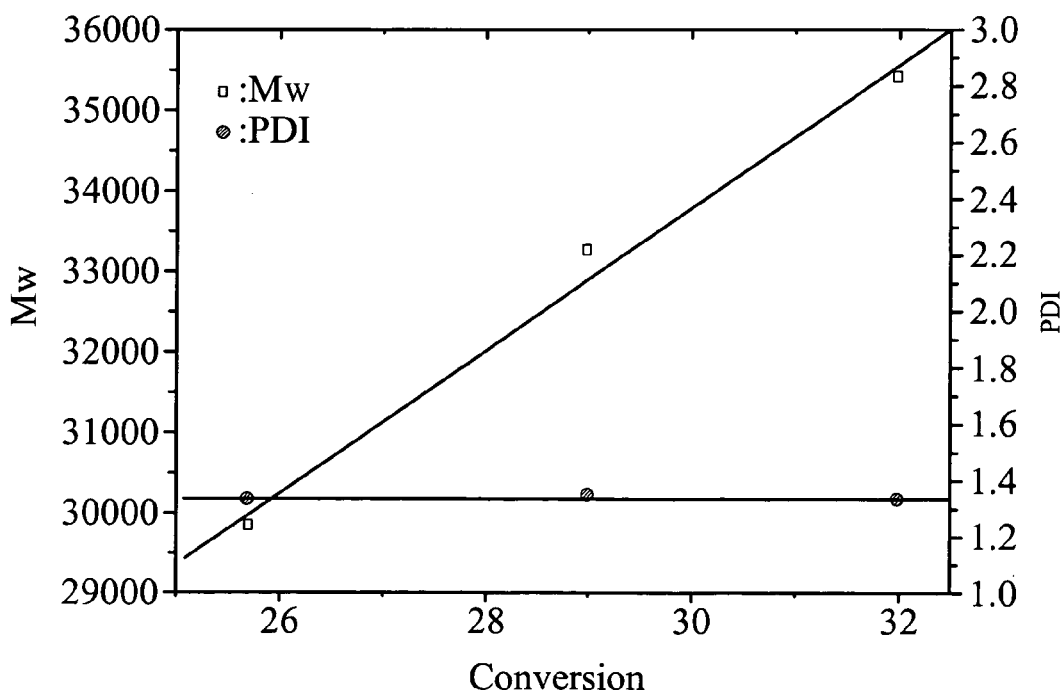
FIG. 2 is a graph plotting molecular weight and polydispersity index against conversion of polymers as disclosed in Example 9~11.

The exact relationship between molecular weight, polydispersity index, and conversion of polymers as disclosed in Example 9~11 is shown in FIG. 2.

COMPARATIVE EXAMPLE 2

Comparative Example 2 was performed as Example 9 except an absence of organometallic RAFT reagent and the reduced reaction time for 15 hours. The properties of polymer product thereof are shown in Table 2.

TABLE 2

|  | Molar rate of monomers to organometallic RAFT reagent (1) | Reaction time | conversion (%) | weight average molecular weight(Mw) | PDI (Mw/Mn) |
| --- | --- | --- | --- | --- | --- |
| Example 9 | 600 | 25 | 32 | 35391 | 1.33 |
| Example 10 | 600 | 20 | 29 | 33258 | 1.35 |
| Example 11 | 600 | 15 | 25.7 | 29843 | 1.33 |
| Comparative example 2 |  | 15 | 38 | 134558 | 1.51 |

The polymerizations as described in Comparative Examples 1 and 2 were performed without the existence of organometallic RAFT reagents. Referring to Table 1 and 2, the molecule weight of polymer products, compared to Examples 6~11, are widely increased and uncontrollable, and the PDI is increased. Moreover, the polymers obtained by Comparative Examples 1 and 2 do not have terminal organometallic functional groups in the polymer chain thereof.

Synthesis of Organic Polymers Through Organometallic Raft Reagaents

EXAMPLE 12

Polymer (3)

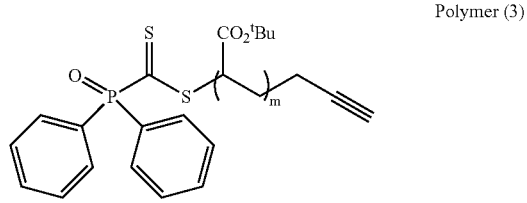

m≧2

1 g of Polymer (1), having terminal organometallic functional groups, as disclosed in Example 6, and 20 ml of acetonitrile were added to a round-bottom flask with low polydispersity index. After mixing completely, the resulting mixture was heated and reacted 15 hours with stirring. By precipitation with methanol, filtration, and condensation, an organic polymer product was obtained. The reaction according to Example 12 is shown below.

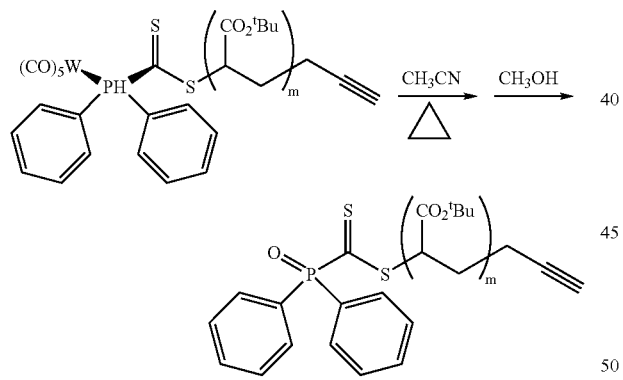

m≧2

Accordingly, the organometallic RAFT reagents according to the present invention can be employed in free radical polymerization to produce polymers having terminal organometallic functional groups with low polydispersity index. Moreover, the polymers further subjected to perform demetallization giving pure organic polymers.

Furthermore, free radical polymerizable monomers, such as acrylate or styrene, can be efficiently polymerized in relatively concentrated solution by the organometallic RAFT reagents.

While the invention has been described by way of example and in terms of the preferred examples, it is to be understood that the invention is not limited to the disclosed examples. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A free radical polymerization process employing organometallic RAFT reagents, comprising:
   reacting at least one free radically polymerizable monomer, at least one initiator, and at least one organometallic RAFT reagent undergoing polymerization to obtain a polymer having terminal organometallic functional groups with a PDI of 1.4 or less,
   wherein the organometallic RAFT reagent has a formula (I), of

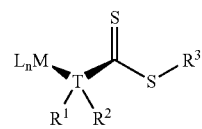

or a formula (II), of:

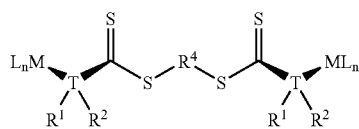

wherein
n is 2, 3, 4, or 5;
L is the same or different ligand which remains bound to M under polymerization conditions;
T is the same or different and is P, C, O, or N;
M is the same or different and is Ti, Zr, Hf, V, Nb, Ta, Cr, Mo, W, Mn, Tc, Re, Fe, Ru, Os, Co, Rh, Ir, Ni, Pd, Pt or Sc;
$R^1$ and $R^2$ is the same or different and is H, saturated or unsaturated alkyl group, cycloalkyl group, heterocycloalkyl group, polycyclic alkyl group, aryl group, heteroaryl group, or alkylaryl group, wherein the saturated or unsaturated alkyl group can be straight or branched and has 1 to 20 carbon atoms;
$R^3$ is alkyl group, aryl group, alkylaryl group, aminoalkyl group, alkylamino group, alkyloxy group, cycloalkyl group, heterocycloalkyl group, polycyclic alkyl group, —R"CN or —R"COOH, wherein R" can be a saturated or unsaturated alkyl group having 1 to 20 carbon atoms; and
$R^4$ is alkylene group, arylene group or alkylarylene group.

2. The free radical polymerization process as claimed in claim 1, wherein the at least one free radically polymerizable monomer is acrylate monomer, styrene monomer or derivatives thereof.

3. The free radical polymerization process as claimed in claim 2, wherein the acrylate monomer has a formula (III), of

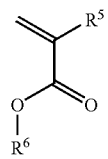

or a formula (IV), of:

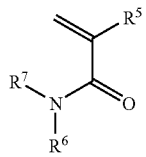

wherein

R5 is hydrogen atom, fluorine atom, halogen atom, cyano group, saturated or unsaturated alkyl group, amino group, cycloalkyl group, heterocycloalkyl group, polycyclic alkyl group, aryl group, heteroaryl group, alkylaryl group, or arylalkyl group, wherein the saturated or unsaturated alkyl group can be straight or branched and has 1 to 20 carbon atoms; and R6 and R7 are the same or different and are hydrogen atom, saturated or unsaturated alkyl group, cycloalkyl group, heterocycloalkyl group, polycyclic alkyl group, adamantyl group, aryl group, heteroaryl group, or alkylaryl group, wherein the saturated or unsaturated alkyl group can be straight or branched and has 1 to 20 carbon atoms.

4. The free radical polymerization process as claimed in claim 2, wherein the styrene monomer has a formula (V), of

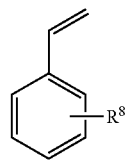

wherein

R8 is hydrogen atom, fluorine atom, halogen atom, cyano group, saturated or unsaturated alkyl group, amino group, cycloalkyl group, heterocycloalkyl group, polycyclic alkyl group, aryl group, heteroaryl group, alkylaryl group, or arylalkyl group, wherein the saturated or unsaturated alkyl group can be straight or branched and has 1 to 20 carbon atoms.

5. The free radical polymerization process as claimed in claim 1, wherein L is the same or different and is monodentate ligand, bidentate ligand, or multi-dentate ligand.

6. The free radical polymerization process as claimed in claim 1, wherein L is the same or different and is carbon monoxide, cyanide, halide, phosphorus-containing ligand, nitrogen-containing ligand, sulfur-containing ligand, or oxygen-containing ligand.

7. The free radical polymerization process as claimed in claim 1, wherein M is the same or different and is Ti, Zr, Cr, Mo, W, Fe, Ru, Os, Ni, Pd, Pt, Rh, or Ir.

8. The free radical polymerization process as claimed in claim 1, wherein $R^3$ is —$CH_2Ph$ or —$CH_2CN$.

9. The free radical polymerization process as claimed in claim 1, wherein $R^4$ is the same or different and is —$CH_2$—, —$C_2H_4$—, or —$C_3H_6$—.

10. The free radical polymerization process as claimed in claim 1, wherein the thiocarbonylthio metallic complex with the structures

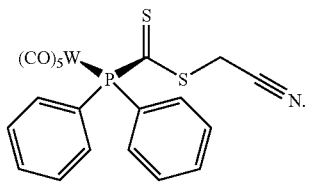

represented by formula (I) is

11. The free radical polymerization process as claimed in claim 1, further comprising:
demetallizing the polymer having terminal organometallic functional groups to remove the organometallic functional groups, giving an organic polymer.

12. The free radical polymerization process as claimed in claim 1, further comprising:
heating the polymer having terminal organometallic functional groups; and
reacting the polymer having terminal organometallic functional groups with alcohol to remove the organometallic functional groups, providing an organic polymer.

13. A polymer with low polydispersity index, comprising the reaction product of the following reactants:
at least one free radically polymerizable monomer;
at least one initiator; and
at least one organometallic RAFT reagent, wherein the organometallic RAFT reagent has a formula (I), of

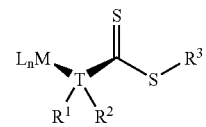

or a formula (II), of:

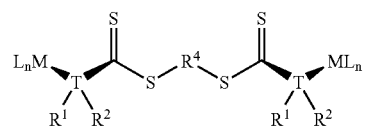

wherein n is 2, 3, 4, or 5;

L is the same or different ligand which remains bound to M under polymerization conditions;

T is the same or different and is P, C, O, or N;

M is the same or different and is Ti, Zr, Hf, V, Nb, Ta, Cr, Mo, W, Mn, Tc, Re, Fe, Ru, Os, Co, Rh, Ir, Ni, Pd, Pt or Sc;

R1 and R2 is the same or different and is H, saturated or unsaturated alkyl group, cycloalkyl group, heterocycloalkyl group, polycyclic alkyl group, aryl group, heteroaryl group, or alkylaryl group, wherein the saturated or unsaturated alkyl group can be straight or branched and has 1 to 20 carbon atoms;

R3 is alkyl group, aryl group, alkylaryl group, aminoalkyl group, alkylamino group, alkyloxy group, cycloalkyl group, heterocycloalkyl group, polycyclic alkyl group, —R"CN or —R"COOH, wherein R" can be a saturated or unsaturated alkyl group having 1 to 20 carbon atoms; and R4 is alkylene group, arylene group or alkylarylene group.

14. The polymer as claimed in claim 13, wherein the at least one free radically polymerizable monomer is acrylate monomer, styrene monomer or derivatives thereof.

15. The polymer as claimed in claim 14, wherein the acrylate monomer has a formula (III), of

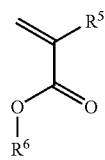

or a formula (IV), of:

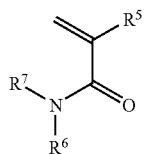

wherein

R5 is hydrogen atom, fluorine atom, halogen atom, cyano group, saturated or unsaturated alkyl group, amino group, cycloalkyl group, heterocycloalkyl group, polycyclic alkyl group, aryl group, heteroaryl group, alkylaryl group, or arylalkyl group, wherein the saturated or unsaturated alkyl group can be straight or branched and has 1 to 20 carbon atoms; and R6 and R7 are the same or different and are hydrogen atom, saturated or unsaturated alkyl group, cycloalkyl group, heterocycloalkyl group, polycyclic alkyl group, adamantyl group, aryl group, heteroaryl group, or alkylaryl group, wherein the saturated or unsaturated alkyl group can be straight or branched and has 1 to 20 carbon atoms.

16. The polymer as claimed in claim 14, wherein the styrene monomer has a formula (V), of

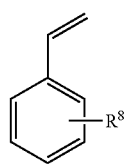

wherein

R8 is hydrogen atom, fluorine atom, halogen atom, cyano group, saturated or unsaturated alkyl group, amino group, cycloalkyl group, heterocycloalkyl group, polycyclic alkyl group, aryl group, heteroaryl group, alkylaryl group, or arylalkyl group, wherein the saturated or unsaturated alkyl group can be straight or branched and has 1 to 20 carbon atoms.

17. The polymer as claimed in claim 13, wherein L is the same or different and is monodentate ligand, bidentate ligand, or multi-dentate ligand.

18. The polymer as claimed in claim 13, wherein L is the same or different and is carbon monoxide, cyanide, halide, phosphorus-containing ligand, nitrogen-containing ligand, sulfur-containing ligand, or oxygen-containing ligand.

19. The polymer as claimed in claim 13, wherein M is the same or different and is Ti, Zr, Cr, Mo, W, Fe, Ru, Os, Ni, Pd, Pt, Rh, or Ir.

20. The polymer as claimed in claim 13, wherein $R^3$ is —$CH_2Ph$ or —$CH_2CN$.

21. The polymer as claimed in claim 13, wherein $R^4$ is the same or different and is —$CH_2$—, —$C_2H_4$—, or —$C_3H_6$—.

22. The polymer as claimed in claim 13, wherein the thiocarbonylthio metallic complex with the structures represented by formula (I) is

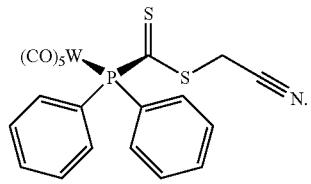

23. A polymer with low polydispersity index, comprising the reaction product through the following steps:

reacting at least one free radically polymerizable monomer, at least one initiator, and at least one organometallic RAFT reagent undergoing polymerization to obtain a polymer having terminal organometallic functional groups; and demetallizing the polymer having terminal organometallic functional groups to remove the organometallic functional groups, giving an organic polymer with a PDI of 1.4 or less, wherein the organometallic RAFT reagent has a formula (II), of:

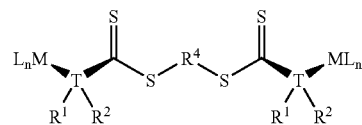

wherein n is 2, 3, 4, or 5;

L is the same or different ligand which remains bound to M under polymerization conditions;

T is the same or different and is P, C, O, or N;

M is the same or different and is Ti, Zr, Hf, V, Nb, Ta, Cr, Mo, W, Mn, Tc, Re, Fe, Ru, Os, Co, Rh, Ir, Ni, Pd, Pt or Sc;

R1 and R2 is the same or different and is H, saturated or unsaturated alkyl group, cycloalkyl group, heterocycloalkyl group, polycyclic alkyl group, aryl group, heteroaryl group, or alkylaryl group, wherein the saturated or unsaturated alkyl group can be straight or branched and has 1 to 20 carbon atoms; and R4 is alkylene group, arylene group or alkylarylene group.

24. The polymer as claimed in claim 23, wherein at least one free radically polymerizable monomer is acrylate monomer, styrene monomer or derivatives thereof.

25. The polymer as claimed in claim 23, wherein L is the same or different and is carbon monoxide, cyanide, halide, phosphorus-containing ligand, nitrogen-containing ligand, sulfur-containing ligand, or oxygen-containing ligand.

26. The polymer as claimed in claim 23, wherein M is the same or different and is Ti, Zr, Cr, Mo, W, Fe, Ru, Os, Ni, Pd, Pt, Rh, or Ir.

27. The polymer as claimed in claim 23, wherein $R^4$ is the same or different and is —$CH_2$—, —$C_2H_4$—, or —$C_3H_6$—.

28. A polymer with low polydispersity index, comprising the reaction product through the following steps:
reacting at least one free radically polymerizable monomer, at least one initiator, and at least one organometallic RAFT reagent undergoing polymerization to obtain a polymer having terminal organometallic functional groups; and demetallizing the polymer having terminal organometallic functional groups to remove the organometallic functional groups, giving an organic polymer with a PDI of 1.4 or less, wherein the organometallic RAFT reagent is

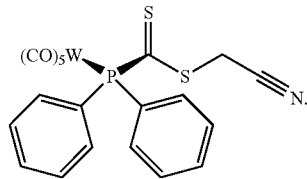

* * * * *